US006993645B2

(12) United States Patent
Joseph et al.

(10) Patent No.: US 6,993,645 B2
(45) Date of Patent: Jan. 31, 2006

(54) SYSTEM AND METHOD FOR THE DELIVERY, RETRIEVAL AND DISPLAY OF CONTENT PRIOR TO OPERATING SYSTEM LOADING

(75) Inventors: Jonathan L. Joseph, Newton, MA (US); Keith J. Huntington, Silver City, NC (US); Rex A. Flynn, Newton, MA (US)

(73) Assignee: Insyde Software, Inc., Southborough, MA (US)

( * ) Notice: Subject to any disclaimer, the term of this patent is extended or adjusted under 35 U.S.C. 154(b) by 605 days.

(21) Appl. No.: 09/733,868

(22) Filed: Dec. 8, 2000

(65) Prior Publication Data

US 2002/0073305 A1    Jun. 13, 2002

Related U.S. Application Data

(60) Provisional application No. 60/169,551, filed on Dec. 8, 1999.

(51) Int. Cl.
*G06F 15/177* (2006.01)

(52) U.S. Cl. ........................................................ 713/2
(58) Field of Classification Search ................ 713/1, 713/2; 715/526
See application file for complete search history.

(56) References Cited

U.S. PATENT DOCUMENTS

| | | | |
|---|---|---|---|
| 5,136,713 A | 8/1992 | Bealkowski et al. | 395/700 |
| 5,210,875 A | 5/1993 | Bealkowski et al. | 395/700 |
| 5,600,766 A | 2/1997 | Deckys et al. | 395/135 |
| 5,732,268 A | 3/1998 | Bizzarri | 395/652 |
| 5,913,040 A | 6/1999 | Rakavy et al. | 395/200.62 |
| 5,964,873 A * | 10/1999 | Choi | 713/2 |
| 5,987,611 A | 11/1999 | Freund | 713/201 |
| 6,067,570 A | 5/2000 | Kreynin et al. | 709/227 |
| 6,158,000 A * | 12/2000 | Collins | 713/1 |

(Continued)

FOREIGN PATENT DOCUMENTS

WO    WO 99/41663 A    8/1999

OTHER PUBLICATIONS

Meuller, Hanno: "Linux Boot Logo Patch" Open Source Development Network, Online! Jul. 20, 1998, XP002174415 Retrieved from the Internet: URL:http://freshmeat.net/projects/linuxbootlogopatch/ retrieved on Aug. 8, 2001!.

(Continued)

*Primary Examiner*—Lynne H. Browne
*Assistant Examiner*—Eric Chang
(74) *Attorney, Agent, or Firm*—Lahive & Cockfield, LLP

(57) ABSTRACT

A system and method for the delivery, retrieval and display of content to a user during the initial boot sequence of a computer or electronic device and/or after the completion of the initial boot sequence but prior to the loading of an operating system is disclosed. The illustrative embodiment of the present invention also includes a non-intrusive method of updating the content is provided that minimizes the disruption to other processes running on the computer or electronic device. The method enables the content to be updated automatically following the loading of the operating system or in response to a user request, depending upon the implementation of the invention. Additional embodiments of the present invention vary the display of content according to user responses to queries posed during the boot sequence and enable the tailoring of content to an individual user based upon a user profile.

38 Claims, 4 Drawing Sheets

U.S. PATENT DOCUMENTS

| | | | |
|---|---|---|---|
| 6,373,498 B1 * | 4/2002 | Abgrall | 345/619 |
| 6,473,855 B1 * | 10/2002 | Welder | 713/2 |
| 6,477,642 B1 * | 11/2002 | Lupo | 713/2 |
| 6,487,656 B1 * | 11/2002 | Kim et al. | 713/2 |
| 6,791,572 B1 * | 9/2004 | Cloney et al. | 345/619 |

OTHER PUBLICATIONS

Rosenbaum, Michael: "BMPtoEPA" Internet, online! 1999, pp. 1-4, XP002174380 Ratzeburg, Germany Retrieved from the Internet: URL:http://www.flazh.de/ retrieved Aug. 8, 2001.

Thought, Deep: "Changing the EPA logo in Award BIOS-update guide" Internet, 'Online! 2001, pp. 1-8, XP002174381 Retrieved from the Internet: URL:http://users.cybercity.dk/ids16178/bios/Bioslogo.html ' retrieved on Aug. 8, 2001.

* cited by examiner

SYSTEM AND METHOD FOR THE DELIVERY, RETRIEVAL AND DISPLAY OF CONTENT PRIOR TO OPERATING SYSTEM LOADING

This application claims the benefit of priority under 35 U.S.C. 119(e) to U.S. provisional application Ser. No. 60/169,551, filed Dec. 8, 1999.

TECHNICAL FIELD

The present invention relates generally to the delivery, retrieval and display of content to a user during the starting of a computer system or electronic device. More particularly, the present invention relates to the delivery, retrieval and display of content to a user prior to the loading of an operating system for a computer system or electronic device.

BACKGROUND OF THE INVENTION

The "boot sequence" for a computer is generally executed when power is first applied to the computer. The boot sequence may also be initiated when the computer is instructed to return to operation when the user instructs the computer to reboot. The boot sequence is controlled by the Basic Input Output System (BIOS) of the computer. The BIOS typically resides in Read Only Memory (ROM). The BIOS performs a sequence of steps prior to transferring control of system resources to the operating system. One of the steps performed by BIOS during this initial time period is a "Power On Self Test", also known as POST. While BIOS is performing the start-up sequence of steps, which can last for over a minute, the system displays technical information that is of little interest to the average user. Following the completion of the POST, conventional computer systems load an operating system, or pieces thereof, into memory and then transfer control of the computer system to the operating system.

Because the user's attention is often focused on the display during the boot sequence, some hardware manufacturers have modified their BIOS to display a splash screen. The BIOS splash screen, is typically a graphic that identifies the manufacturer. The BIOS splash screen is generally stored in ROM, since at the time it is to be displayed, communication with other persistent storage mediums, such as a hard drive, have yet to be established. Because ROM is difficult if not impossible for a consumer to modify, the splash screen cannot readily be altered after the consumer takes delivery of the computer. As a result, the user sees the same splash screen each time the BIOS executes the boot sequence.

SUMMARY OF THE INVENTION

The illustrated embodiment of the present invention provides a method for delivering, retrieving and displaying content to a user during the initial boot sequence of a computer or electronic device and/or after the completion of the initial boot sequence but prior to the loading of an operating system. The method enables the content to be updated automatically following the loading of the operating system or in response to a user request, depending upon the implementation of the invention. The method further enables the updating process to be conducted in a non-intrusive manner so as not to disturb other processes running on the computer system or electronic device. Additional embodiments of the present invention enable the display of content to a user to take place in an interactive format during the boot sequence.

In one embodiment of the present invention, a method is provided for delivering, retrieving and displaying content to a user of a computer system during the POST phase of a BIOS start-up sequence. The POST is interrupted long enough to retrieve and display content to a user. The content is then displayed to the user, in lieu of the usual display of technical information, for the remainder of the POST. The content is retrieved from a designated persistent storage medium location. Following the completion of the POST and the loading of an operating system into memory, the content is updated by retrieving new content and transferring it to a designated persistent storage medium storage location. The retrieval and transfer of the updated content occurs when CPU usage is low, and/or the connection between the computer system and the updated content location is determined to have enough bandwidth to allow the transfer.

In an alternate embodiment of the present invention, a method is provided for delivering, retrieving and displaying content to a user of a computer system following the completion of the POST phase of a BIOS start-up sequence and before an operating system is loaded into memory. An interval is created following the POST that is used to retrieve and display content to a user. The content is displayed to the user for a predetermined amount of time, in place of the usual display of technical information, and then the operating system finishes loading. The content is retrieved from a designated persistent storage medium location. Following the completion of the loading of an operating system into memory, the content is updated by retrieving new content and transferring it to a designated persistent storage medium storage location. The retrieval and transfer of the updated content occurs when CPU usage is low, and/or sufficient bandwidth to transfer a portion of the updated content has been predicted based on past polling history and current bandwidth availability as indicated by a transfer of a portion of the updated content.

In a different embodiment of the present invention, a method is provided for delivering, retrieving and displaying content to a user of any electronic device that separates device initialization from operating system load, before an operating system is loaded into the memory of the electronic device. An interval is created prior to loading an operating system into memory that is used to retrieve and display content to a user. The content is displayed to the user for a pre-determined amount of time and then the operating system is loaded. The content is retrieved from a designated persistent storage medium location. Following the completion of the loading of an operating system into memory, the content is updated by retrieving new content and transferring it to a designated persistent storage medium storage location. The retrieval and transfer of the updated content occurs when CPU usage is low, and/or sufficient bandwidth to transfer a portion of the updated content has been predicted based on past polling history and current bandwidth availability as indicated by a transfer of a portion of the updated content.

DETAILED DESCRIPTION OF THE INVENTION

The illustrated embodiment of the present invention provides a method for delivering, retrieving and displaying content to a user during the initial boot sequence of a computer or electronic device and/or after the completion of the initial boot sequence but prior to the loading of an operating system. A non-intrusive method of updating the content is provided that minimizes the disruption to other processes running on the computer or electronic device. The method enables the content to be updated automatically following the loading of the operating system or in response to a user request, depending upon the implementation of the invention. Additional embodiments of the present invention enable the display of content to vary according to the responses from the user to queries posed during the boot sequence.

Figure 1:
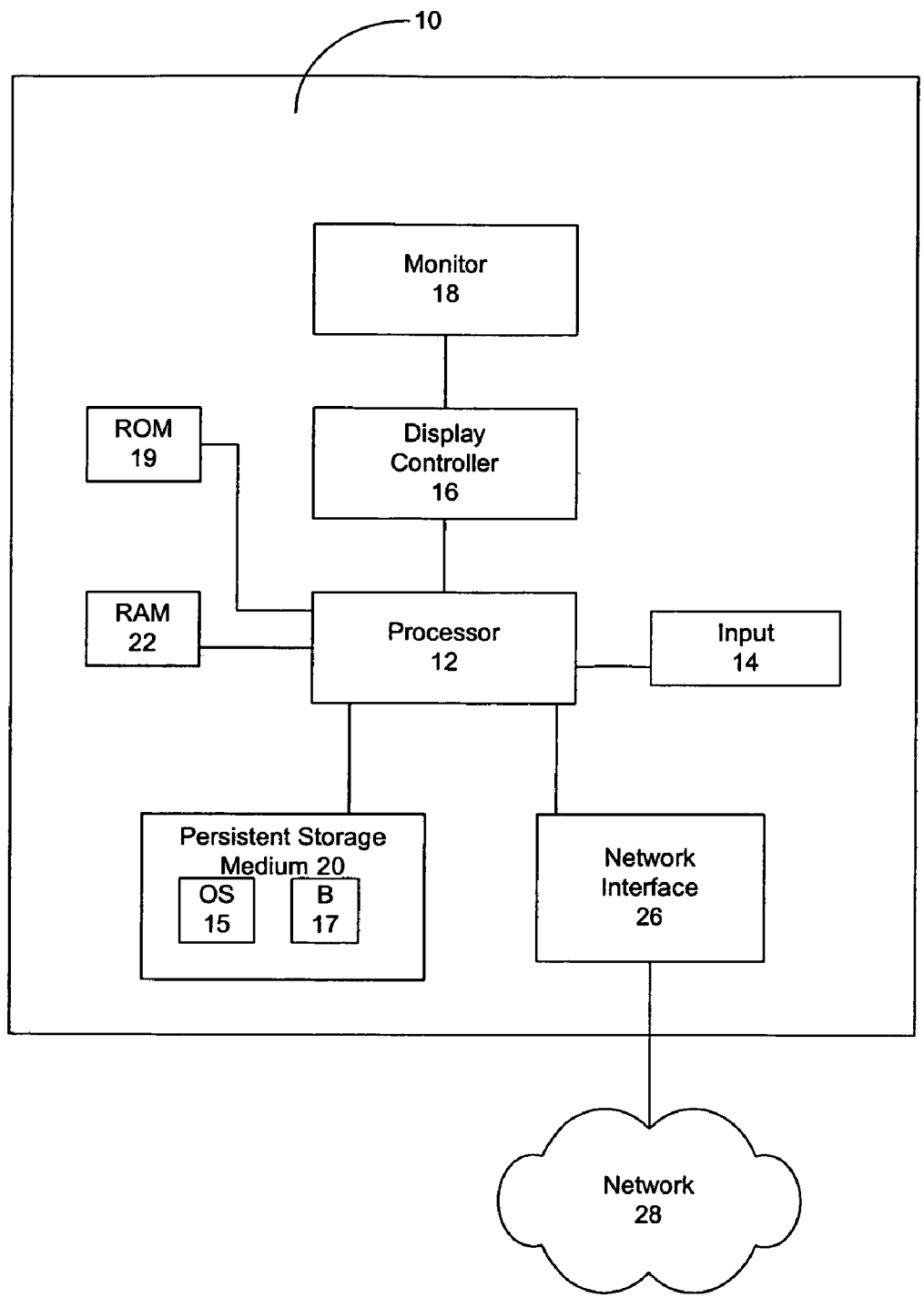
FIG. 1 depicts a block diagram of an electronic device suitable for practicing the illustrated embodiment.

FIG. 1 depicts an electronic device 10 suitable for practicing the illustrated embodiment. Examples of such an electronic device include certain types of telephones and pagers, palm top devices, PDAs, and the like. Referring to FIG. 1, the electronic device 10 includes a processor 12 in communication with an input device 14, such as a keyboard, and a display controller 16. The display controller 16 is connected to, and controls the operation of, a monitor 18 or other output device. The electronic device 10 further includes various memory units for storage of instructions to be executed by the processor 12. These memory units include a read-only memory (ROM) 19 for persistent storage of small amounts of infrequently changed data, a persistent storage medium 20 for storage of large amounts of data, and random access memory (RAM) 22 for non-persistent storage of data that must be quickly accessible to the processor 12. Non-persistent storage mediums such as RAM do not retain their data once the electricity flow to the electronic device 10 is interrupted by shutting down, re-booting or (as happens occasionally) power fluctuations. Conversely, persistent storage mediums such as a hard drive or ROM retain their data over time unless the data is specifically deleted or overwritten.

The persistent storage medium 20 is most typically a hard disk. However, the subject matter of the invention does not depend on the specific manner used to achieve persistent data storage. For example, the persistent data storage medium 20 can also be a flash ROM. Moreover, because of the distributed nature of modem devices, the persistent storage medium 20 need not be physically proximate to the other components of the electronic device 10 but can instead be accessible over a network. The persistent storage medium 20 also provides storage for software instructions such as an operating system 15 and a browser 17. Portions of both the operating system 15 and the browser 17 are routinely paged into RAM 22 during operation of the electronic device 10 following the boot sequence. The persistent storage medium 20 and non-persistent RAM 22 are generally in communication with the processor 12 over a bus 24. The ROM 19, which holds instructions for execution of the boot sequence, is in direct communication with the processor 12. This is necessary due to the fact that during the boot sequence, the software for managing the bus 24 has not yet been loaded.

The bus 42 is also in communication with a network interface 26 for providing access to a network 28.

Figure 2:
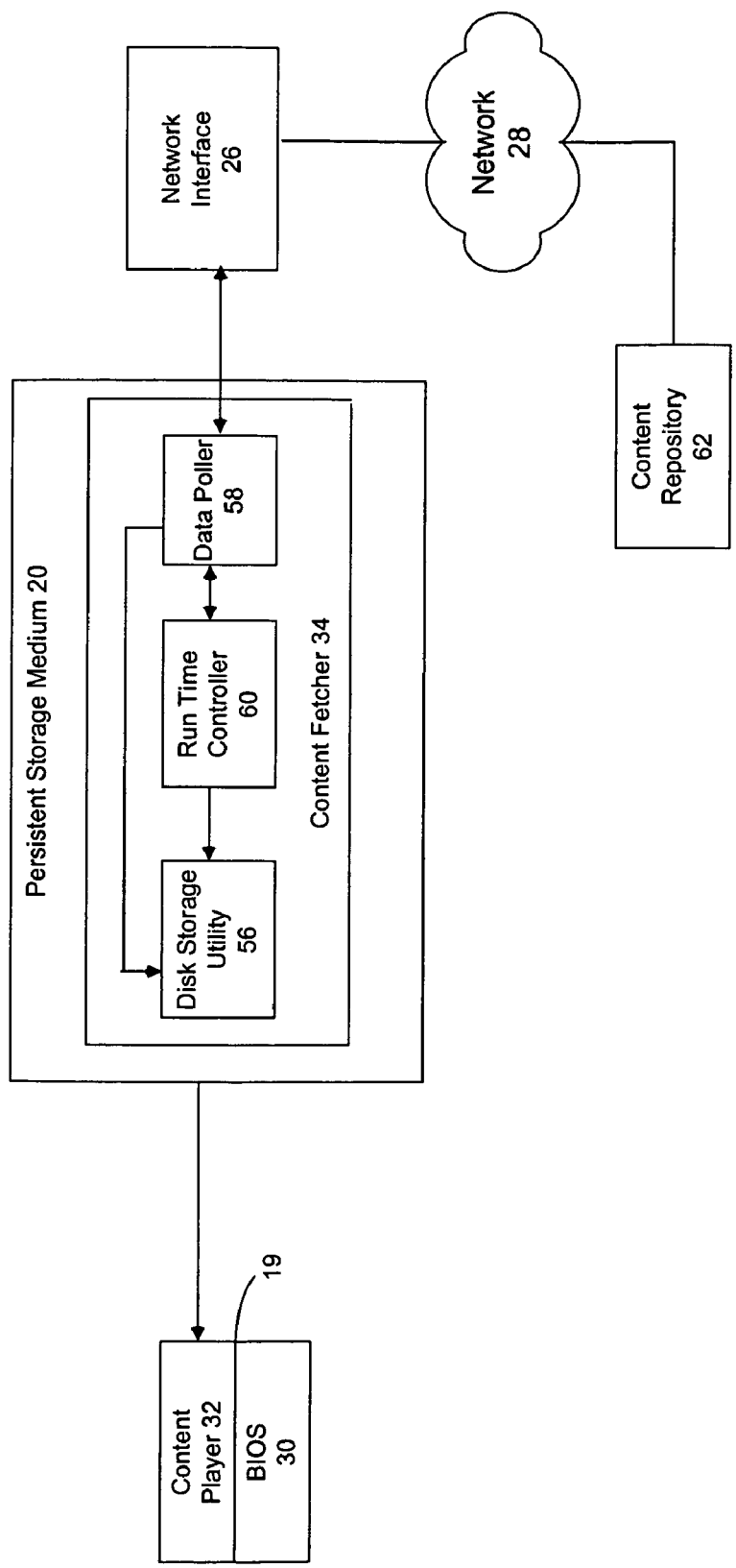
FIG. 2 depicts a block diagram of components contained in the electronic device of FIG. 1.

Referring now to FIG. 2, the ROM 19 provides storage for a Basic Input Output System (BIOS) 30 and a content player 32. The BIOS 30 is responsible for initiating the operation of the electronic device 10. It performs checks of the hardware, including a POST. The POST checks the hardware of the electronic device 10 such as the keyboard, power supply, system board, system memory, memory modules, controllers, graphics system, diskette drives and hard drives and displays error messages in the event of a problem. Following the POST, the BIOS 30 is responsible for loading pieces of the operating system 15 into RAM 22. The persistent storage medium 20 provides storage for a content-fetcher 34. The content-player 32 and the content-fetcher 34, both of which are typically implemented as a sequence of instructions stored on a medium, cooperate to provide for the delivery of programmable content to the user of the electronic device 10 during the boot sequence. It should be noted that in alternate embodiments, the content-player 32 is stored in the persistent storage medium 20 instead of in ROM 19.

The content to be displayed during the boot sequence can take a variety of forms. For example, the content can be a splash screen for display of an advertising message, a public service announcement, or a message from the system administrator. The content can also include a sequence of splash screens. These splash screens, if displayed rapidly, can provide the illusion of animation. Alternatively, the splash screens can be displayed slowly so that a sequence of messages can be displayed to the user during the boot sequence. The method of the invention is not restricted to the visual delivery of content. Content can also include selected audio clips or audiovisual displays. However, in most systems, the software drivers for managing the delivery of audio information to speakers are managed by the operating system and are not available during the boot sequence. In contrast, the display controller 16 for controlling the monitor 18 is generally made available fairly early in the boot sequence. As a result, the preferred method for delivery of content is by means of the monitor 18.

The splash screens displayed by the electronic device 10 embodying the illustrated embodiment of the present invention can also be interactive in nature. The extent of the interactivity can be relatively simple. For example, the splash screen may require that the user perform an affirmative act such as pressing the return key before the boot sequence continues. This is a useful feature for insuring that the user actually reads the splash screen. However, the interactive nature of the splash screen can also be more extensive. For example, a first splash screen may provide choices which will result in the display of additional splash screens, the contents of which depend on choices made in the previous splash screen.

Figure 3:
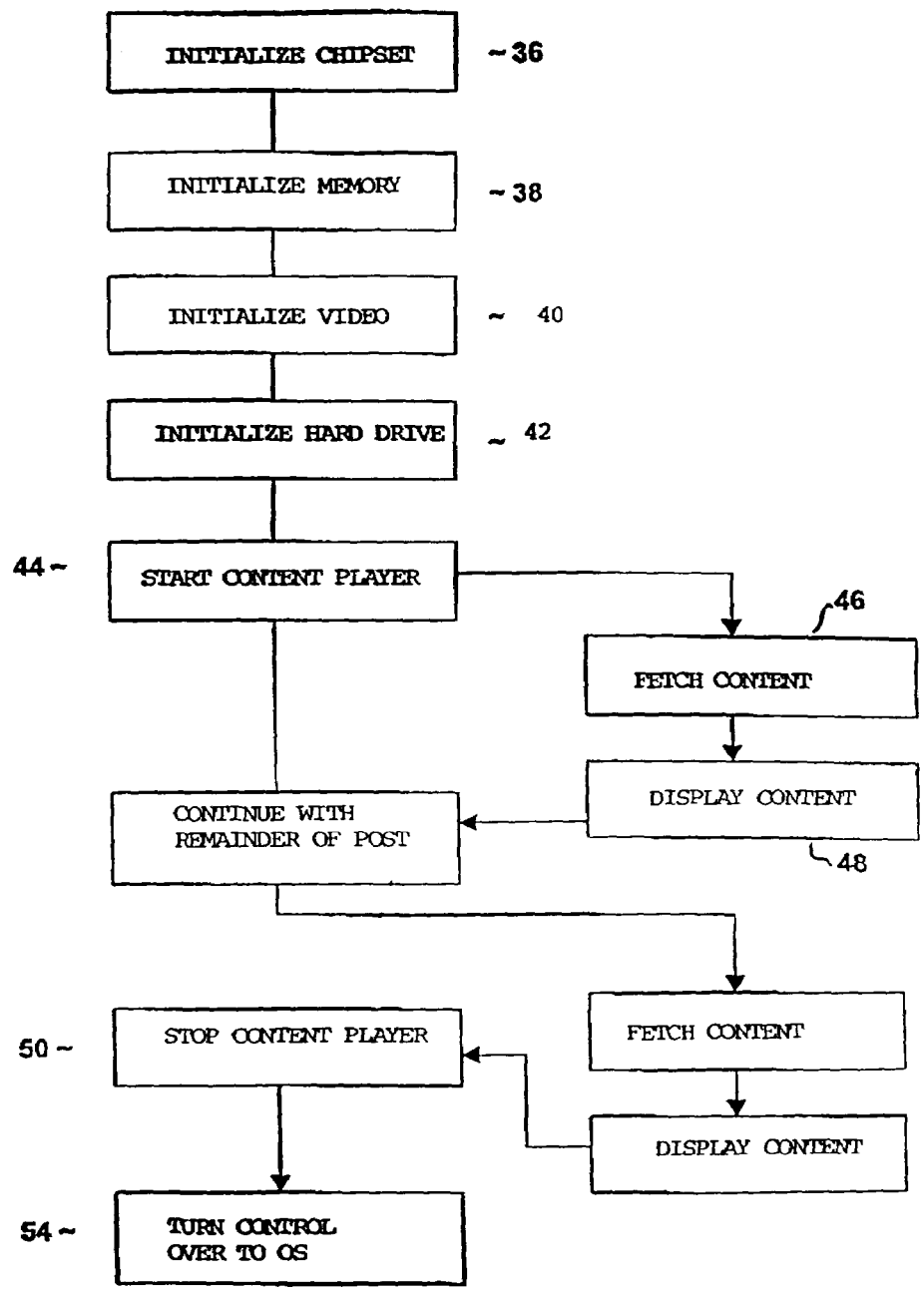
FIG. 3 is a flow chart overview of the steps involved in the delivery, retrieval and display of content to a user during a boot sequence.

The display of content during the boot sequence is controlled by the content player 32, the operation of which is more readily understood by considering the sequence of events that take place during a typical boot sequence, as shown in FIG. 3. During the execution of the POST, the BIOS 30 executes the steps of initializing the chip set (step 36) and initializing memory (step 38). The BIOS then begins the process of initializing the video display (step 40) and the hard disk controller (step 42). Once the memory is initialized, the VGA display is writeable, and the hard disk controller has at least one open channel, the BIOS starts the content player 32(step 44). The content player then fetches data (step 46) from the persistent storage medium 20.

Because of the limited availability of system resources during the boot sequence, it is preferable that this data be fetched from a predefined location on the persistent storage medium 20. This data includes an image and an associated header containing instructions for the processing of that image. The content player then writes the specified image to the display monitor according to the instructions contained in its associated header (step 48). If the image is to include interactive content, or if the image is intended to change the system state in response to user input, the instructions for performing these functions are likewise contained in the header and can be executed by the content player. As the content player displays content, the BIOS continues the boot sequence. The content player continues its function until the BIOS is about to read the boot sector preparatory to turning control of system resources to the operating system 15. If the content player 32 is displaying interactive content, it will wait for the last response from the user, otherwise the BIOS ends the boot sequence by halting the content player (step 50) and turning control over to the operating system 15(step 54).

In one embodiment, the delivery, retrieval and display of content to a user does not take place during the Power On Self Test in BIOS. Instead, a time interval is created after the Power On Self Test and just before the loading of the operating system 15. During the created time interval, the content player 32 delivers and displays content for a user as outlined above. At the end of the pre-determined time period, or at the completion of interactive responses from a user, the operating system 15, or portions thereof, are loaded into memory and the operation of the electronic device 10 is thereafter controlled by the operating system.

The electronic device may be a certain type of telephone or pager, palm top device, PDA, or similar device that separates device initialization from operating system load. For these types of devices, the present invention creates a time interval of a pre-determined duration prior to starting the operating system and displays content to a user during that interval.

The operating system itself usually has its own splash screen that is displayed while the operating system is being loaded into memory. The most well known example is the display of the Windows™ logo from Microsoft Corporation, Redmond, Wash., which is displayed while Windows™ is loading. In one embodiment of the present invention, a method is provided to replace the operating system splash screen with content by substituting the content from the designated persistent storage medium location, the replacement occurring prior to the operating system load. The replacement may occur as the result of an interaction with the user before operating system load as described previously. The content is displayed between the time the operating system 15 starts loading and the time it is ready to assume control of the electronic device 10.

Following completion of the boot sequence and loading of the operating system 15, the content-fetcher 34, which resides on the persistent storage medium 20, is made available to the electronic device 10. The illustrated content fetcher 34 includes a disk storage utility 56 and a data poller 58, both of which are under the control of a runtime controller 60. The content-fetcher 34 provides the mechanism through which the data stored on the persistent storage medium 20 can periodically be changed.

Figure 4:
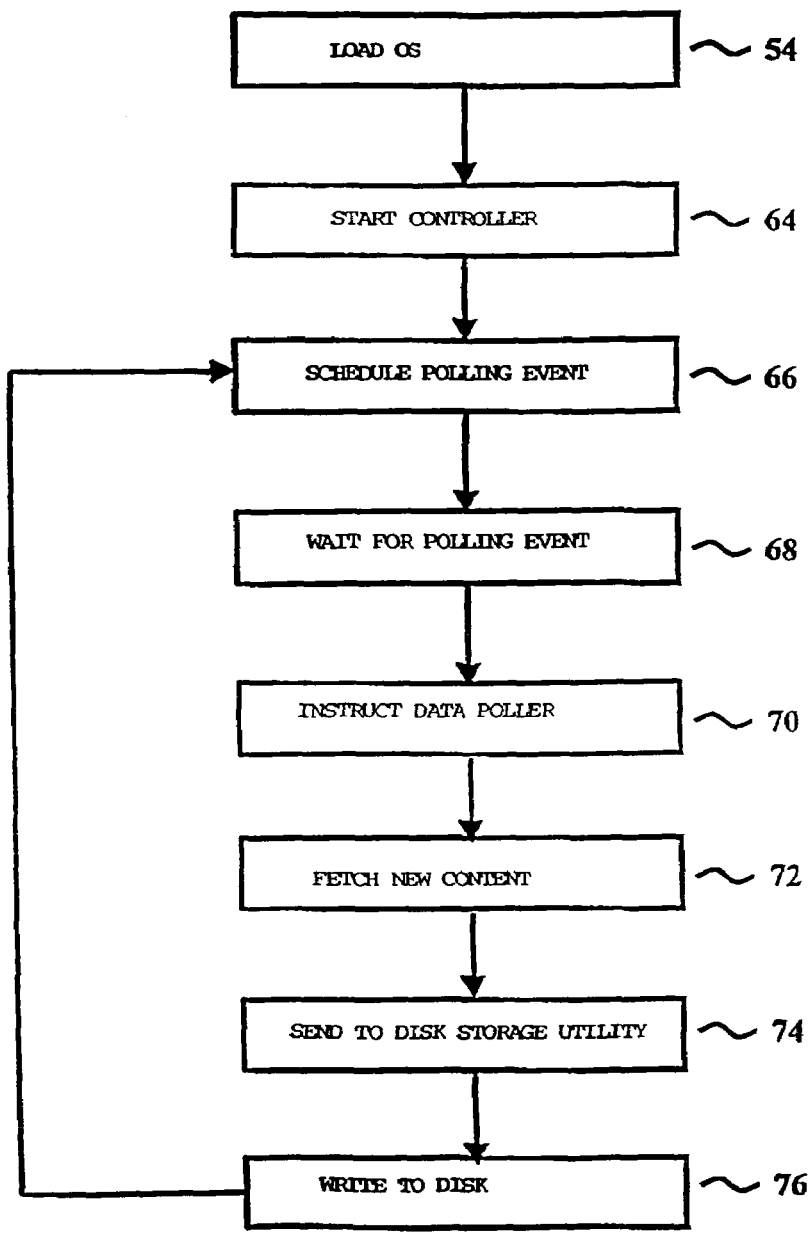
FIG. 4 is a flow chart of the steps involved in retrieving and storing new content in the illustrated embodiment.

FIG. 4 depicts the process by which the content fetcher 34 retrieves updated content for later display to the user. In one embodiment, the run-time controller 60 is started shortly after loading and starting the operating system 15 (step 64). The runtime controller 60 establishes a schedule of polling events for polling one or more known updateable data repositories for new content 62 (step 66). The schedule can establish uniformly spaced polling events. Each polling event defines a time for executing the polling event and associates a particular content repository 62 or sequence of content repositories for polling. When the run-time controller 60 determines that the time has come to execute the next polling event (step 68), it instructs the data poller 58 to check one or more specified content repositories 62 for new content to be displayed by the content-player 32 at the next boot sequence (step 70). In another embodiment, the content fetcher 34 retrieves new data in response to an input user command. The content fetcher 34 will only activate in response to a direct request from a user instead of on a regular polling schedule.

The illustrated embodiment of the present invention provides a method for retrieving new content in a non-intrusive manner that does not interrupt other processes running on the electronic device 10. The content repositories 62 are typically internet addresses maintained by content providers for accessibility by the data poller. However, the content repositories can also be preloaded, or may be supplied by alternative delivery mechanisms such as subscription CDs. When the data poller 58 is instructed to fetch new content (step 70) the data poller checks to determine the location of the content repository 62. If the content repository 62 is local, the data poller 58 checks the current level of CPU usage to make sure that retrieving the new content will not unreasonably slow down other running processes. To accomplish this, the data poller 58 compares the current CPU usage against a pre-defined parameter. If the level of CPU usage exceeds the parameter, the data poller 58 will wait until such time as the CPU usage falls below the parameter to retrieve the new content. Similarly, if the content repository is at a remote location, a network connection will need to be established. In one embodiment, the data poller 58 will wait until another process establishes a network connection and then predict if there is enough spare bandwidth to retrieve the new content without unreasonably slowing down other executing processes. This is accomplished by examining the effective bandwidth available to past data polling events, and predicting the available effective bandwidth for future data polling events. A portion of the updated content from the remote location is transferred to the persistent storage medium 20 based on the predicted availability of bandwidth. The actual time required to transfer the portion of the updated content is then compared against the time that such a transfer was expected to take in order to determine the actual current available bandwidth. The time interval until the next poll and the amount of content to retrieve during the next poll are then adjusted in order to use a small portion of the predicted bandwidth. The level of CPU usage may also be checked. In another embodiment, the data poller will check the CPU usage to determine whether the usage level is low enough to establish a new network connection and retrieve the new content without disrupting other processes running on the electronic device 10 or electronic device. Once the data poller has retrieved the new content it signals the run-time controller (step 72).

The content that is delivered to a user may also be tailored to the requesting user. In one embodiment, the content fetcher 34 includes a user ID with the request by the data poller 58 to the content repository 62. The content repository 62 responds with content selected to appeal to the user.

Following receipt of the signal indicating completion of the polling event, the run-time controller 60 provides the content retrieved by the data poller 58 to the disk-storage utility 56 (step 74). The disk-storage utility 56 then stores the retrieved content at a predefined location on the persistent storage medium 20 (step 76) for retrieval and display by the content player 32. In this manner, the content fetcher 34 and the content player 32 cooperate to provide updateable content for delivery during the boot sequence.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

We claim:

1. In a computer system, said system including a Basic Input Output System (BIOS), said BIOS including a Power On Self Test (POST), a method for displaying selected content to a user of said system during said Power On Self Test, said method comprising the steps of:

initiating said Power On Self Test;

retrieving selected content from a designated persistent storage medium location during said Power On Self Test, said designated persistent storage medium separate from a storage medium holding said BIOS;

creating a time interval between the completion of said Power On Self Test and a commencement of the loading of an operating system for said computer system;

displaying said selected content to said user during at least part of said Power On Self Test and during at least part the created time interval;

updating the selected content stored in said designated persistent storage medium location subsequent to the completion of the loading of the operating system; and displaying the updated selected content to a user during at least part of the next execution of said Power On Self Test and a subsequent created time interval between the completion of said Power On Self Test and a commencement of the loading of an operating system for said computer system.

2. The method of claim 1 wherein said updating of the selected content stored in said designated persistent storage medium location occurs by automatically transferring said selected content from a second persistent storage medium to said designated persistent storage medium location.

3. The method of claim 1 wherein said updating of the selected content stored in said designated persistent storage medium location occurs by transferring said selected content from a second persistent storage medium to said designated persistent storage medium location in response to a request from said user.

4. The method of claim 1 wherein said updating of the selected content stored in said designated persistent storage medium location occurs by automatically transferring said selected content from a remote location to said designated persistent storage medium location.

5. The method of claim 1 wherein said updating of the selected content stored in said designated persistent storage medium location occurs by transferring said selected content from a remote location to said designated persistent storage medium location in response to a request from said user.

6. The method of claim 1 further comprising the steps of:

providing a process on said computer system to poll a remote location for updated content;

transferring a portion of said updated content from said remote location to said designated persistent storage medium location over an established network connection, said transfer occurring in response to polling from said process, said polling occurring based on past polling history from said process to said remote location;

determining the effective bandwidth available to said transfer, and predicting the effective bandwidth available to future transfers of said updated content based on the history of transfers front said remote location to said persistent storage medium and the results of the transfer of said portion of said updated content;

computing the time interval to wait until the transfer of the next portion of said updated content to said designated persistent storage medium location based on said predicted future bandwidth; and transferring said next portion of said updated content from said remote location to said designated persistent storage medium, the size of said next portion based on said predicted future bandwidth.

7. The method of claim 6 further comprising the steps of:

determining the central processing unit (CPU) usage of said computer system; and comparing said CPU usage of said computer system against a pre-determined parameter prior to determining the available bandwidth of said network connection.

8. The method of claim 1 further comprising the steps of:

determining the central processing unit (CPU) usage of said computer system;

comparing said CPU usage of said computer system against a pre-determined parameter;

establishing a connection between said computer system and said remote location containing updated content when said CPU usage is below said parameter; and transferring said updated content from said remote location to said designated persistent storage medium location using said connection.

9. The method of claim 1 further comprising the steps of:

determining the central processing unit (CPU) usage of said computer system;

comparing said CPU usage of said computer system against a pre-determined parameter; and transferring said updated content from a second persistent storage medium to said designated persistent storage medium location.

10. The method of claim 1 wherein said selected content displayed to said user is retrieved based upon a user profile containing information about the individual user.

11. The method of claim 1, further comprising the steps of:

querying said user during said Power On Self Test;

displaying said selected content to said user based upon the responses from said user to said query.

12. In a computer system, said system including a Basic Input Output System (BIOS), said BIOS including a Power On Self Test (POST), a method for displaying selected content to a user of said system, said method comprising the steps of:

executing said Power On Self Test;

creating a time interval between the completion of said Power On Self Test and a commencement of the loading of an operating system for said computer system;

retrieving selected content from a designated persistent storage medium location subsequent to the completion of said Power On Self Test and prior to loading the operating system for said computer system into memory, said designated persistent storage medium separate from a storage medium holding said BIOS;

displaying said selected content to said user during said created time interval following the completion of said Power On Self Test and prior to loading the operating system for said computer system into memory;

updating the selected content stored in said designated persistent storage medium location subsequent to the completion of loading said operating system into memory; and displaying the updated selected content to a user during an interval between the next execution of said Power On Self Test and next commencement of the loading of the operating system for said computer system into memory.

13. The method of claim 12 wherein said updating of the selected content stored in said designated persistent storage medium location occurs by automatically transferring said selected content from a second persistent storage medium to said designated persistent storage medium location.

14. The method of claim 12 wherein said updating of the selected content stored in said designated persistent storage medium location occurs by transferring said selected content from a second persistent storage medium to said designated persistent storage medium location in response to a request from said user.

15. The method of claim 12 wherein said updating of the selected content stored in said designated persistent storage medium location occurs by automatically transferring said selected content from a remote location to said designated persistent storage medium location.

16. The method of claim 12 wherein said updating of the selected content stored in said designated persistent storage medium location occurs by transferring said selected content from a remote location to said designated persistent storage medium location in response to a request from said user.

17. The method of claim 12 further comprising the steps of:
providing a process on said computer system to poll a remote location for updated content;
transferring a portion of said updated content from said remote location to said designated persistent storage medium location over an established network connection, said transfer occurring in response to polling from said process, said polling occurring based on past polling history from said process to said remote location;
determining the effective bandwidth available to said transfer, and
predicting the effective bandwidth available to future transfers of said updated content based on the history of transfers from said remote location to said persistent storage medium and the results of the transfer of said portion of said updated content;
computing the time interval to wait until the transfer of the next portion of said updated content to said designated persistent storage medium location based on said predicted future bandwidth; and transferring said next portion of said updated content from said inflow location to said designated persistent storage medium, the size of said next portion based on said predicted future bandwidth.

18. The method of claim 17 further comprising the steps of:
determining the central processing unit (CPU) usage of said computer system; and
comparing said CPU usage of said computer system against a pre-determined parameter prior to determining the available bandwidth of said network connection.

19. The method of claim 12 further comprising the steps of:
determining the central processing unit (CPU) usage of said computer system;
comparing said CPU usage of said computer system against a pre-determined parameter;
establishing a connection between said computer system and said remote location containing updated content when said CPU usage is below said parameter; and
transferring said updated content from said remote location to said designated persistent storage medium location using said connection.

20. The method of claim 12 further comprising the steps of:
determining the central processing unit (CPU) usage of said computer system;
comparing said CPU usage of said computer system against a pre-determined parameter; and
transferring said updated content from a second persistent storage medium to said designated persistent storage medium location.

21. The method of claim 12 wherein the selected content displayed to said user is retrieved based upon a user profile containing information about the individual user.

22. The method of claim 12, comprising the further steps of:
querying said user during said Power On Self Test; and
displaying said selected content to said user during said created interval based upon the responses from said user to said queries.

23. In an electronic device, a method for displaying selected content to a user of said electronic device, said method comprising the steps of:
retrieving selected content from a selected persistent storage medium location prior to loading an operating system for said electronic device into memory;
creating a time interval by delaying the loading of an operating system for said electronic device into memory;
displaying said selected content to said user during said time interval;
updating the selected content stored in said selected persistent storage medium location subsequent to the completion of loading said operating system into memory, said updating occurring by automatically transferring said selected content from a second persistent storage medium to said designated persistent storage medium location without user input; and
displaying the updated selected content to a user during a created time interval prior to a commencement of the next loading of an operating system for said electronic device into memory.

24. The method of claim 23 wherein updating the selected content stored in said selected persistent storage medium location subsequent to the completion of loading said operating system into memory occurs by automatically transferring said selected content from a remote location to said designated persistent storage medium location.

25. The method of claim 23 wherein said updating of the selected content stored in said designated persistent storage medium location occurs by transferring said selected content from a remote location to said designated persistent storage medium location in response to a request from said user.

26. The method of claim 23 further comprising the steps of:
providing a process on said electronic device to poll a remote location for updated content;
transferring a portion of said updated content from said remote location to said designated persistent storage medium location over an established network connection, said transfer occurring in response to polling from said process, said polling occurring based on past polling history from said process to said remote location;
determining the effective bandwidth available to said transfer, and
predicting the effective bandwidth available to future transfers of said updated content based on the history of transfers from said remote location to said persistent storage medium and the results of the transfer of said portion of said updated content;
computing the time interval to wait until the transfer of the next portion of said updated content to said designated persistent storage medium location based on said predicted future bandwidth; and
transferring said next portion of said updated content from said remote location to said designated persistent storage medium, the size of said next portion based on said predicted future bandwidth.

27. The method of claim 26 further comprising the steps of:
determining the central processing unit (CPU) usage of said electronic device; and
comparing said CPU usage of said electronic device against a pre-determined parameter prior to determining the available bandwidth of said network connection.

28. The method of claim 23 further comprising the steps of:
determining the central processing unit (CPU) usage of said electronic device;
comparing said CPU usage of said electronic device against a pre-determined parameter;
establishing a connection between said electronic device and a remote location containing updated content when said CPU usage is below said parameter; and
transferring said updated content from said remote location to said designated persistent storage medium location using said connection.

29. The method of claim 23 further comprising the steps of:
determining the central processing unit (CPU) usage of said electronic device;
comparing said CPU usage of said electronic device against a pre-determined parameter; and
transferring said updated content from a second persistent storage medium to said designated persistent storage medium location.

30. The method of claim 23 wherein the displayed selected content is retrieved based upon a user profile containing information about the individual user.

31. The method of claim 23 further comprising the steps of:
querying said user prior to loading said operating system for said electronic device;
displaying said content based upon the responses from said user to said queries.

32. The method of claim 23 wherein said electronic device is a computer system.

33. In an electronic device, a medium holding executable steps for a method for displaying selected content to a user of said electronic device, said method comprising the steps of:
retrieving selected content from a selected persistent storage medium location prior to loading an operating system for said electronic device into memory;
creating a time interval by delaying the loading of an operating system for said electronic device into memory;
displaying said selected content to said user during said time interval;
updating the selected content stored in said selected persistent storage medium location subsequent to the completion of loading said operating system into memory, said updating occuring by automatically transferring said selected content from a remote location to said designated persistent storage medium location; and
displaying the updated selected content to a user during a created time interval prior to the commencement of the next loading of an operating system for said electronic device into memory.

34. The medium of claim 33 wherein said electronic device is a computer system.

35. In an electronic device, a medium holding executable steps for a method for displaying selected content to a user of said electronic device, said method comprising the steps of:
retrieving selected content from a selected persistent storage medium location prior to loading an operating system for said electronic device into memory;
creating a time interval by delaying the loading of an operating system for said electronic device into memory:
displaying said selected content to said user during said time interval;
updating the selected content stored in said selected persistent storage medium location subsequent to the completion of loading said operating system into memory, said updating occuring by transferring said selected content from a remote location to said designated persistent storage medium location in response to a request from a user; and
displaying the updated selected content to a user during a created time interval prior to the commencement of the next loading of an operating system for said electronic device into memory.

36. The medium of claim 35 wherein said electronic device is a computer system.

37. In a computer system, said system including a Basic Input Output System (BIOS), said BIOS including a Power On Self Test (POST), and a medium holding executable steps for a method for displaying selected content to a user of said system during said Power On Self Test, said method comprising the steps of:

initiating said Power On Self Test;
creating a time interval between the completion of said Power On Self Test and a commencement of the loading of an operating system for said computer system;
retrieving selected content from a designated persistent storage medium location during said Power On Self Test, said designated persistent storage medium not holding said BIOS;
displaying said selected content to said user during at least part of said Power On Self Test and during at least part of the created time interval;
updating the selected content stored in said designated persistent storage medium location subsequent to the completion of the loading of the operating system; and
displaying the updated selected content to a user during at least part of the next execution of said Power On Self Test and a subsequent created time interval between the completion of said Power On Self Test and a commencement of the loading of an operating system for said computer system.

38. In a computer system, said system including a Basic Input Output System (BIOS), said BIOS including a Power On Self Test (POST), and a medium holding executable steps for a method for displaying selected content to a user of said system, said method comprising the steps of:

executing said Power On Self Test;
creating a time interval between the completion of said Power On Self Test and a commencement of the loading of an operating system for said computer system;
retrieving selected content from a designated persistent storage medium location subsequent to the completion of said Power On Self Test and prior to loading the operating system for said computer system into memory, said designated persistent storage medium not holding said BIOS;
displaying said selected content to said user during said created time interval following the completion of said Power On Self Test and prior to loading the operating system for said computer system into memory;
updating the selected content stored in said designated persistent storage medium location subsequent to the completion of loading said operating system into memory; and
displaying the updated selected content to a user during an interval between the next execution of said Power On Self Test and next commencement of the loading of the operating system for said computer system into memory.

* * * * *